United States Patent
Hibner et al.

(10) Patent No.: US 7,363,184 B2
(45) Date of Patent: Apr. 22, 2008

(54) SYSTEM AND METHOD FOR DRIFT COMPENSATION IN A SEAT LOAD SENSING SYSTEM

(75) Inventors: Christopher J. Hibner, Canton, MI (US); Raymond J. David, Dearborn Heights, MI (US)

(73) Assignee: TRW Automotive U.S. LLC, Livonia, MI (US)

( * ) Notice: Subject to any disclaimer, the term of this patent is extended or adjusted under 35 U.S.C. 154(b) by 1 day.

(21) Appl. No.: 11/054,492

(22) Filed: Feb. 9, 2005

(65) Prior Publication Data

US 2006/0175096 A1 Aug. 10, 2006

(51) Int. Cl.
*G01G 23/01* (2006.01)
*B60R 21/015* (2006.01)

(52) U.S. Cl. .......... 702/101; 701/45; 73/1.13; 177/136; 177/185; 180/273; 280/735

(58) Field of Classification Search ............... 701/45; 702/101–102; 73/1.13; 177/136, 155, 185; 180/273; 280/735
See application file for complete search history.

(56) References Cited

U.S. PATENT DOCUMENTS

| | | | |
|---|---|---|---|
| 4,080,657 A | 3/1978 | Caldicott et al. | |
| 4,316,517 A | 2/1982 | Jonath | |
| 4,817,026 A * | 3/1989 | Inoue et al. | 708/300 |
| 5,656,800 A | 8/1997 | Naito et al. | |
| 5,710,716 A | 1/1998 | Hurst et al. | |
| 5,805,467 A | 9/1998 | Richards | |
| 6,056,079 A | 5/2000 | Cech et al. | |
| 6,138,067 A * | 10/2000 | Cobb et al. | 701/45 |
| 6,479,766 B2 * | 11/2002 | Gray et al. | 177/144 |
| 6,502,048 B1 | 12/2002 | Lichtinger et al. | |
| 6,557,424 B1 | 5/2003 | Morell | |
| 6,571,647 B1 | 6/2003 | Aoki et al. | |
| 6,609,054 B2 | 8/2003 | Wallace | |
| 6,640,175 B2 | 10/2003 | Vos et al. | |
| 6,643,575 B2 | 11/2003 | Ishida et al. | |
| 6,650,978 B1 | 11/2003 | Patterson et al. | |
| 6,677,538 B2 | 1/2004 | Cook, Jr. et al. | |
| 6,689,960 B2 | 2/2004 | Aoki | |
| 6,725,165 B1 | 4/2004 | Knox et al. | |
| 6,774,319 B2 | 8/2004 | Aoki et al. | |
| 2001/0025730 A1 | 10/2001 | Cook, Jr. et al. | |
| 2002/0125051 A1 | 9/2002 | Aoki | |
| 2003/0174063 A1 | 9/2003 | Basir et al. | |
| 2003/0196495 A1 | 10/2003 | Saunders et al. | |
| 2003/0213622 A1 | 11/2003 | Sakai et al. | |
| 2003/0216886 A1 | 11/2003 | Hattori et al. | |
| 2003/0220766 A1 | 11/2003 | Saunders et al. | |
| 2004/0016577 A1 | 1/2004 | Lichtinger et al. | |
| 2004/0124018 A1 | 7/2004 | Yanagi | |
| 2004/0154841 A1 | 8/2004 | Suzuki | |
| 2004/0215381 A1 | 10/2004 | Jitsui et al. | |

FOREIGN PATENT DOCUMENTS

JP 2001-099699 * 4/2001

* cited by examiner

*Primary Examiner*—Randy W Gibson
(74) *Attorney, Agent, or Firm*—Tarolli, Sundheim, Covell & Tummino LLP

(57) ABSTRACT

A method (60) for adjusting a sensed load W(s) of a vehicle seat weight sensing system (10) includes the step (64) of determining a rate of change $\dot{W}(t), \dot{W}_{avg}$ in the sensed load. The method (60) also includes the step (66) of determining the likelihood of drift in the sensed load W(s) in response to the determined rate of change $\dot{W}(t), \dot{W}_{avg}$.

18 Claims, 4 Drawing Sheets

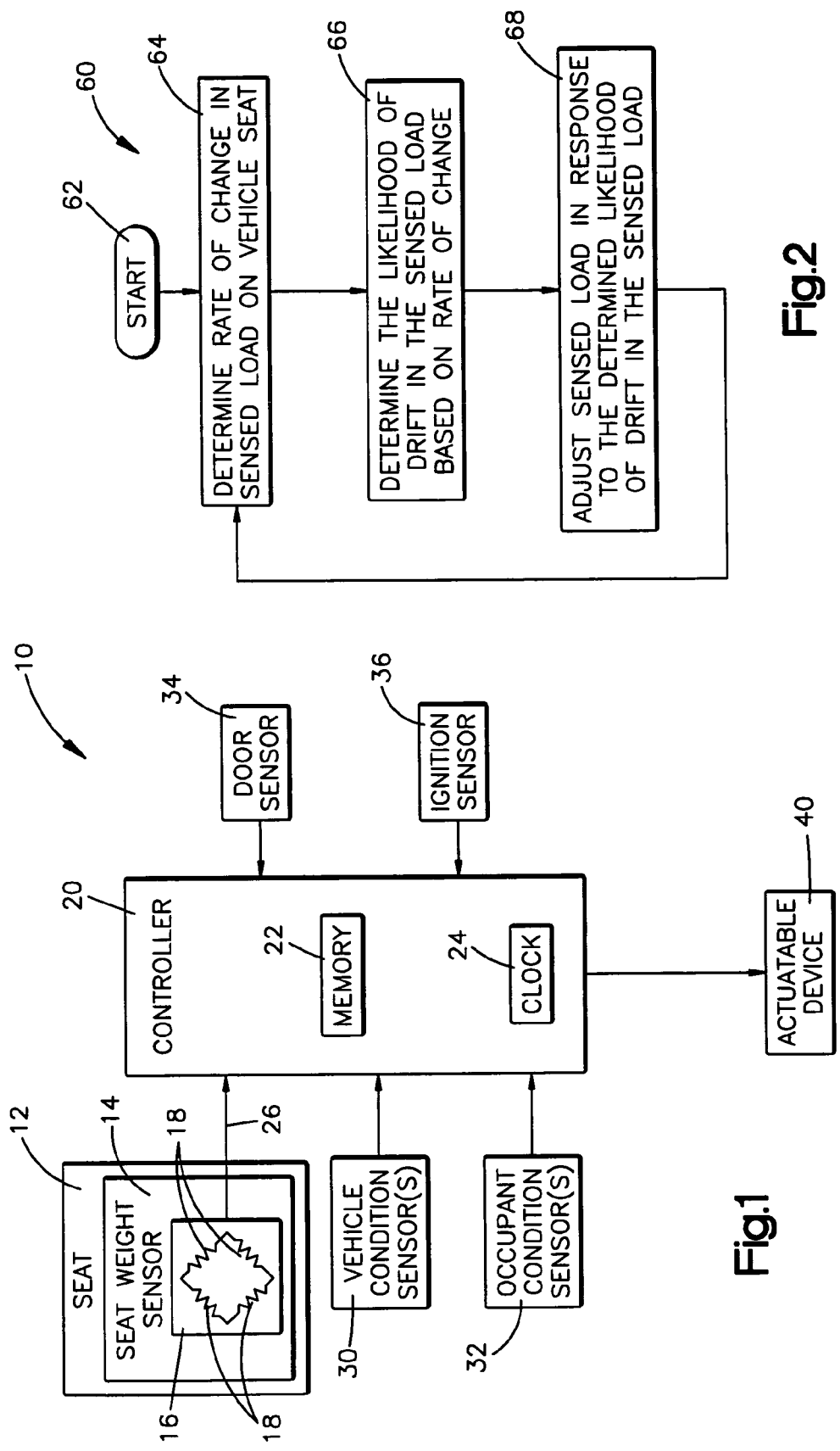

SYSTEM AND METHOD FOR DRIFT COMPENSATION IN A SEAT LOAD SENSING SYSTEM

TECHNICAL FIELD

The present invention relates to a system for sensing a load on a vehicle seat and, more particularly, to a system and method for drift compensation in the seat load sensing system.

BACKGROUND OF THE INVENTION

It is known to disable a vehicle occupant protection device, such as an air bag for an occupant of a vehicle seat, if it is determined that an occupant of the seat is under a certain weight. There are various known seat weight sensing systems that determine the weight or load on the vehicle seat. These known seat weight sensing systems typically include weight sensors that are mounted on the vehicle seat. It is also known to distinguish between the weight of an adult seated in the seat, of a child seated in the seat, and of a child seat cinched down tight in the vehicle seat and, in response, to permit, inhibit, or tailor actuation of the protection device.

Seat weight sensing systems may include strain gauges fixed to a vehicle seat frame member in order to sense strain in the member caused by changing loads on the vehicle seat. These strain gauges may be arranged in a bridge circuit in, order to eliminate temperature errors. The bridge circuit functions to eliminate these errors when all of the strain gauges in the circuit are at the same temperature.

During periods where the vehicle HVAC system is used to warm-up or cool down the vehicle, some strain gauges in the bridge circuit may warm-up or cool down more rapidly than others. As a result, temperature differentials between the individual strain gauges in the bridge circuit may occur and result in erroneous variations or "drift" in the sensed load. Drift may also occur as the result of fatigue in the parts upon which the sensor is mounted and as the result of aging of the sensor or sensor components.

Since the strain gauges are typically at the same ambient temperature when the vehicle initially loaded, the initial sensed load can typically be accurate. As the vehicle is heated or cooled from ambient temperature conditions, temperature transients between the strain gauges in the bridge circuit may occur. The duration of temperature transients can vary depending on factors, such as the ambient temperature from which the vehicle is heated or cooled by the HVAC system. As an example, the heating or cooling period may last for 15-20 minutes after activating the HVAC system. Once the heating or cooling period has lapsed and the strain gauges in the bridge circuit are operating at the same temperature, the temperature transients no longer pose a problem.

SUMMARY OF THE INVENTION

In accordance with the present invention, a method for adjusting a sensed load of a vehicle seat weight sensing system includes the step of determining a rate of change in the sensed load. The method also includes the step of determining the likelihood of drift in the sensed load in response to the determined rate of change.

Also, in accordance with the present invention, a method for adjusting a sensed load of a vehicle seat weight sensing system includes the step of determining a rate of change in the sensed load. The method also includes the step of adjusting the sensed load to compensate for drift in the sensed load in response to the determined rate of change in the sensed load.

Further, in accordance with the present invention, a vehicle seat weight sensing system includes a seat weight sensor associated with a vehicle seat. A controller is operative to determine a sensed weight on the vehicle seat in response to a sensed load provided by the seat weight sensor. The controller includes a portion for determining a rate of change in the sensed load and a portion for determining the likelihood of drift in the sensed load in response to the determined rate of change.

BRIEF DESCRIPTION OF THE DRAWINGS

The foregoing and other features and advantages of the invention will become apparent to one skilled in the art upon consideration of the following description of an exemplary embodiment of the invention and the accompanying drawings, in which:

FIG. 1 is a block diagram of a system in accordance with the present invention;

FIG. 2 is a flow chart illustrating steps of a process performed by the system of FIG. 1 according to the invention;

DESCRIPTION OF EMBODIMENTS

Figure 4:
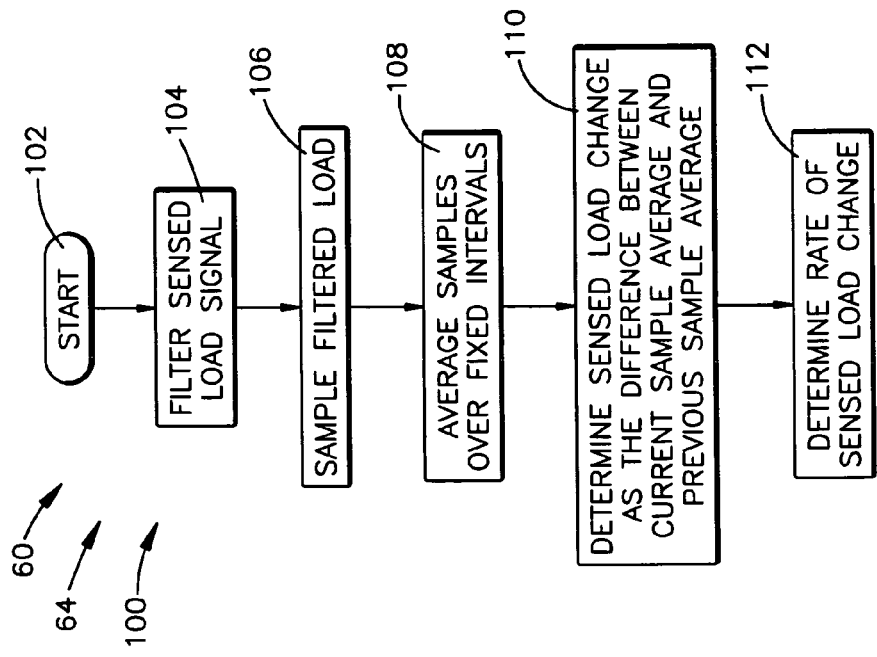
FIGS. 3 and 4 are flow charts illustrating alternative embodiments of a process performed at one of the steps in the process of FIG. 2.

As representative of the present invention, FIG. 1 illustrates a system 10 in accordance with the present invention. The system 10 includes a vehicle seat, indicated schematically at 12, such as a front passenger seat of a vehicle (not shown). The system 10 also includes a seat weight sensor 14 that provides an output 26 to a controller 20 via means, such as lead wires. The output 26 of the seat weight sensor 14 is related to the load or weight on the vehicle seat 12.

The seat weight sensor 14 comprises strain gauges 18 arranged in a bridge circuit 16 (e.g., a Wheatstone bridge circuit) on a load bearing member of a seat frame structure. The seat weight sensor 14 may be responsive to loads or weight on the seat 12 over a large range, with relatively high sensitivity. For example, the each strain gauge 18 of the seat weight sensor 14 may be responsive to loads or weights up to 100 kilograms or more with a one-tenth kilogram (0.10 kg) sensitivity.

The seat weight sensor 14 may be susceptible to drift, which can be caused by a variety of conditions. For example, drift can be caused by temperature transients that occur while the occupant compartment of the vehicle is heated or cooled from ambient conditions. For example, in hot summer ambient conditions, the seat weight sensor 14 may be susceptible to drift caused by temperature transients while the vehicle HVAC system is used to cool the vehicle occupant compartment. As another example, in cold winter ambient conditions, the seat weight sensor 14 may be susceptible to drift caused by temperature transients while the vehicle HVAC system is used to heat the vehicle occupant compartment. This drift occurs as a result of temperature differentials between the strain gauges 18 in the bridge circuit 16 of the seat weight sensor 14 during the temperature transients. Drift may also occur as the result of fatigue in the parts upon which the sensor 16 is mounted and as the result of aging of the sensor or sensor components, such as the strain gauges 18.

The system 10 may also include one or more vehicle condition sensors 30 that are operative to provide outputs related to sensed vehicle conditions. For example, the vehicle condition sensors 30 may include vehicle crash and/or rollover sensors in which the outputs are related to the occurrence of vehicle events, such as a vehicle collision and/or a vehicle rollover.

The system 10 may also include one or more occupant condition sensors 32 that are operative to provide to the controller 20 outputs related to sensed occupant conditions. For example, the occupant condition sensors 32 may include a seatbelt latch sensor for which the output is related to the latched condition of a seatbelt of the vehicle seat 12. As another example, the occupant condition sensors 32 may include seat position sensor for which the output is related to the position (e.g., forward/rearward) of the vehicle seat 12.

The system 10 may also include a vehicle door sensor 34 (e.g., a switch) that is operative to provide to the controller 20 an output related to an opened/closed condition of a vehicle door. The system 10 may further include a vehicle ignition sensor 36 that is operative to provide to the controller 20 an output related to an activated/de-activated condition of a vehicle ignition.

The system 10 may also include an actuatable device 40, such as an actuatable device for helping to protect an occupant of the vehicle seat 12. The actuatable devices may, for example, be an inflator for an air bag, an inflator for a side curtain, an actuator for a knee bolster, or an actuator for a seat belt retractor. The actuatable device 40 is actuatable in response to an output 22 from the controller 20.

The controller 20 is operative to control actuation of the actuatable device in response to the respective outputs of the seat weight sensor 14, vehicle condition sensors 30, and occupant condition sensors 32. The controller 20 is operative to actuate the actuatable device 40 in a known manner in response to receiving an output from the vehicle condition sensors 30 indicative of the occurrence of an event for which occupant protection is desired, such as a collision or a rollover. The controller 20 may tailor or inhibit actuation of the actuatable device 40 in response to the outputs from the seat weight sensor 14 and/or occupant condition sensors 32. For example, the controller 20 may inhibit actuation of the actuatable device 40 in response to the outputs of the seat weight sensor 14 indicating a weight on the vehicle seat 12 below a predetermined minimum. As another example, the controller 20 may tailor actuation of the actuatable device 40 in response to the outputs of the seat weight sensor 14 and occupant condition sensor 32 indicating an unbelted occupant in the vehicle seat 12.

The system 10 may also include memory 22, which may be part of the controller 20. The memory 22 is operative to store data, even when the vehicle ignition is turned off, as to whether the actuatable device 40 is enabled or disabled. The system 10 may also include a clock or timer 24, which may be part of the controller 20.

The controller 20 is operative to receive the output 16 of the seat weight sensor 14 and determine a sensed seat weight responsive to the output. The controller 20 is also operative to adjust the zero point of the seat weight sensing system 10 to help correct zero point errors in the system.

FIG. 2 is a flow diagram illustrating a process or method 60 performed within the system of FIG. 1. More particularly, the process 60 of FIG. 2 is implemented in the controller 20 and performs adjustments of the sensed load or weight on the vehicle seat 12 to help compensate for drift in the sensed load.

The drift compensation process 60 begins at step 62. This may occur, for example, upon activation of an ignition system of the vehicle. The process 60 then proceeds to step 64, where a determination is made as to the rate of change in the sensed load. The process 60 then proceeds to step 66 where a determination of the likelihood of drift in the sensed load is made based on the rate of change determined at step 64. The process 60 then proceeds to step 68, where the sensed load is adjusted in response to the determined likelihood of drift in the sensed load.

The process 60 then proceeds to step 64 and repeats. Thus, it will be appreciated that, in the embodiment of FIG. 2, the process 60 operates continually throughout the entire ignition cycle of the vehicle. The process 60 is active any time the vehicle ignition is activated. The process 60 monitors continually for drift in the sensed load and makes adjustments to the sensed load any time the ignition is activated. The process 60 could, however, have alternative durations. For example, the process 60 could begin at the expiration of a predetermined time delay after activation of the vehicle ignition. Also, the process 60 could end at the expiration of a predetermined time delay after deactivation of the vehicle ignition.

Figure 3:
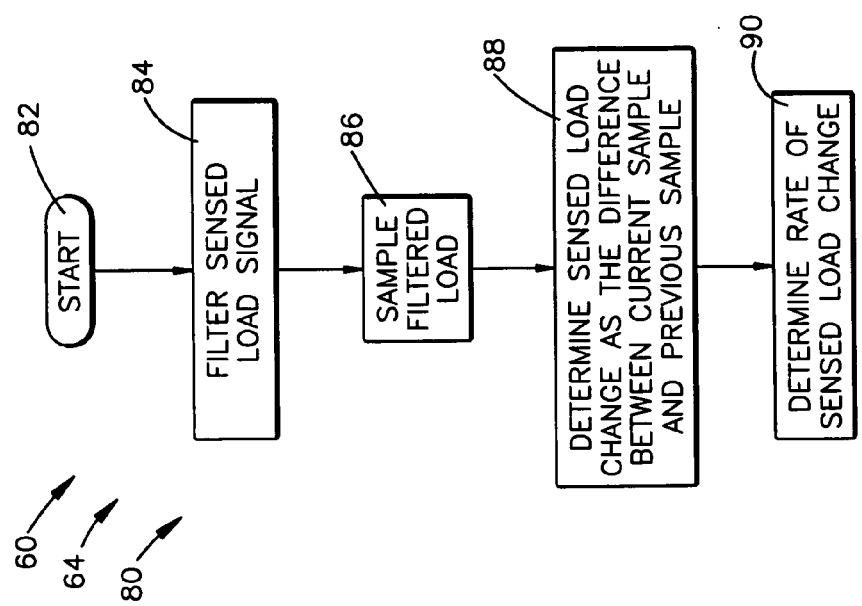

The rate of change in the sensed load determined at step 64 of the process 60 may be determined in a variety of manners. One particular process or method for making this determination is shown in FIG. 3. FIG. 3 illustrates a process or method 80 performed within the system 10 of FIG. 1 and, more particularly, the process of FIG. 3 details steps for performing step 64 in the process 60 of FIG. 2. The process 80 of FIG. 3 is implemented in the controller 20 and determines the rate of change in the sensed load.

The rate of change determination process 80 of FIG. 3 starts, as indicated at step 82, when the process 60 reaches step 64. The process 80 proceeds to step 84 where the sensed load signal is filtered to remove road noise. For example, the sensed load signal may be filtered at step 84 using a moving average filter of size $t_a$. The size $t_a$ of such as moving average filter may be any value suited to provide a desired filtering effect, such as ten seconds. The process 80 then proceeds to step 86, where the filtered load is sampled at a predetermined rate, such as once per second.

The process 80 then proceeds to step 88, where the sensed load change, $\Delta W(t)$, is determined according to Equation 1, as follows:

$$\Delta W(t) = W(t_n) - W(t_{n-1}) \qquad \text{(Equation 1)}$$

where $W(t_n)$ is the current filtered load sample and $W(t_{n-1})$ is the previous filtered load sample. The process 80 then proceeds to step 90, where the rate of change in sensed load is determined according to Equation 2 as follows:

$$\dot{W}(t) = \frac{\Delta W(t)}{t_n - t_{n-1}} \quad \text{(Equation 2)}$$

The process 80 repeats for each iteration of step 64 of the process 60 of FIG. 2. The process 80 may be active for the entire ignition cycle of the vehicle or for an alternative duration, as described above.

An alterative process or method determining the rate of change in the sensed load at step 64 of the process 60 is shown in FIG. 4. FIG. 4 illustrates a process or method 100 performed within the system 10 of FIG. 1 and, more particularly, the process of FIG. 4 details steps for performing step 64 in the process 60 of FIG. 2. The process 100 of FIG. 4 is implemented in the controller 20 and determines the rate of change in the sensed load.

The rate of change determination process 100 of FIG. 4 starts, as indicated at step 102, when the process 60 reaches step 64. The process 100 then proceeds to step 104, where the sensed load signal is filtered to remove road noise. For example, the sensed load signal may be filtered using a moving average filter of size $t_a$. The size $t_a$ of such as moving average filter may be any value suited to provide a desired filtering effect, such as ten seconds. The process 100 then proceeds to step 106, where the filtered load is sampled at a predetermined rate, such as ten times per second. The process 100 then proceeds to step 108, where the samples are downsampled by averaging the samples over a fixed interval, such as one second. The sample rate at step 106, the fixed interval at step 108, or both could have any value suited to provide desired results.

The process 100 then proceeds to step 110, where the sensed load change, $\Delta W_{avg}$, is determined according to Equation 3, as follows:

$$\Delta W_{avg} = W_{avg(n)} - W_{avg(n-1)} \quad \text{(Equation 3)}$$

where $W_{avg(n)}$ is the current sampled average load and $W_{avg(n-1)}$ is the previous sampled average load. The process 100 then proceeds to step 112, where the rate of change in sensed load is determined according to Equation 4 as follows:

$$\dot{W}_{avg} = \frac{\Delta W_{avg}}{t_n - t_{n-1}} \quad \text{(Equation 4)}$$

The process 100 repeats for each iteration of step 64 of the process 60 of FIG. 2. The process 100 may be active for the entire ignition cycle of the vehicle or for an alternative duration, as described above.

Figure 5:
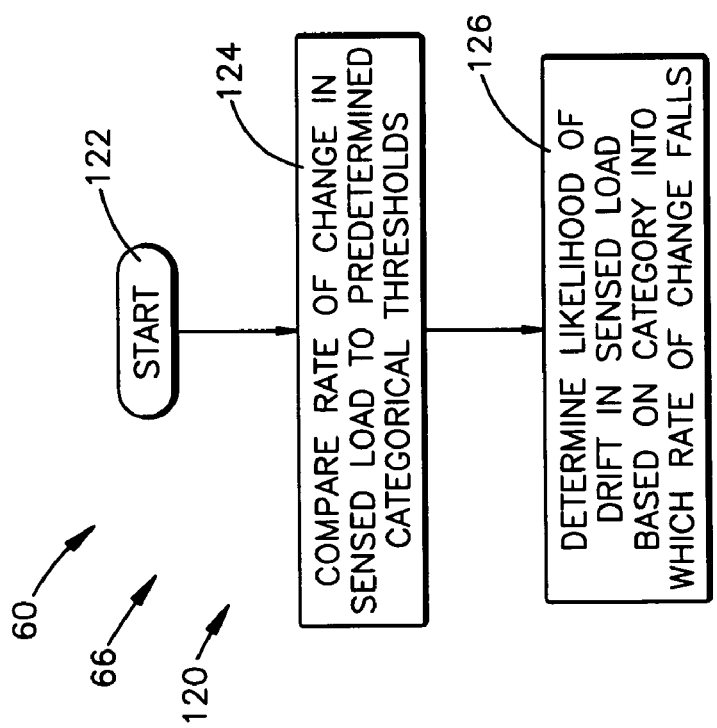
FIG. 5 is a flow chart illustrating a process performed at another one of the steps in the process of FIG. 2 according to the invention.

The likelihood of drift in the sensed load determined at step 66 of the process 60 is determined in accordance with the process or method shown in FIG. 5. FIG. 5 illustrates a process or method 120 performed within the system 10 of FIG. 1 and, more particularly, the process of FIG. 5 details steps for performing step 66 in the process 60 of FIG. 2. The process 120 of FIG. 5 is implemented in the controller 20 and determines the likelihood of drift in the sensed load based on the rate of change in the sensed load determined at step 64 of the process 60 of FIG. 2.

The drift likelihood determination process 120 of FIG. 5 starts, as indicated at step 122, when the process 60 reaches step 66. The process 120 then proceeds to step 124 where the rate of change in the sensed load determined at step 64 of the process 60 (FIG. 2) is compared to predetermined categorical thresholds. These thresholds are determined based on the principal that, by nature, changes in sensed load caused by drift occur relatively slowly, whereas actual load changes caused by, for example, occupants, occur relatively quickly. The thresholds implemented at step 124 may vary. The process 120 then proceeds to step 126 where a determination is made as to the likelihood that the sensed load change is the result of drift in the sensed load. The determination at step 126 is made based on the threshold comparison made at step 124. This may be done, for example, via a look-up table. An example of the thresholds used at step 124 and their corresponding likelihoods of drift in the sensed load determined at step 126 is shown below in Table 1:

TABLE 1

| Rate of Change Threshold ($\dot{W}(t)$, $\dot{W}_{avg}$) | Likelihood of Drift/ Load Change | Load Change Coefficient (k) |
|---|---|---|
| −0.4 to 0.4 kg/second | Drift Very Likely/ Load Change Very Unlikely | 0.9 |
| 0.4 to 0.6 kg/second −0.4 to −0.6 kg/second | Drift Likely/ Load Change Unlikely | 0.5 |
| Above 0.6 kg/second Below −0.6 kg/second | Drift Very Unlikely/ Load Change Very Likely | 0.0 |

The process 120 repeats for each iteration of step 66 of the process 60 of FIG. 2.

The process 120 may be active for the entire ignition cycle of the vehicle or for an alternative duration, as described above.

Figure 6:
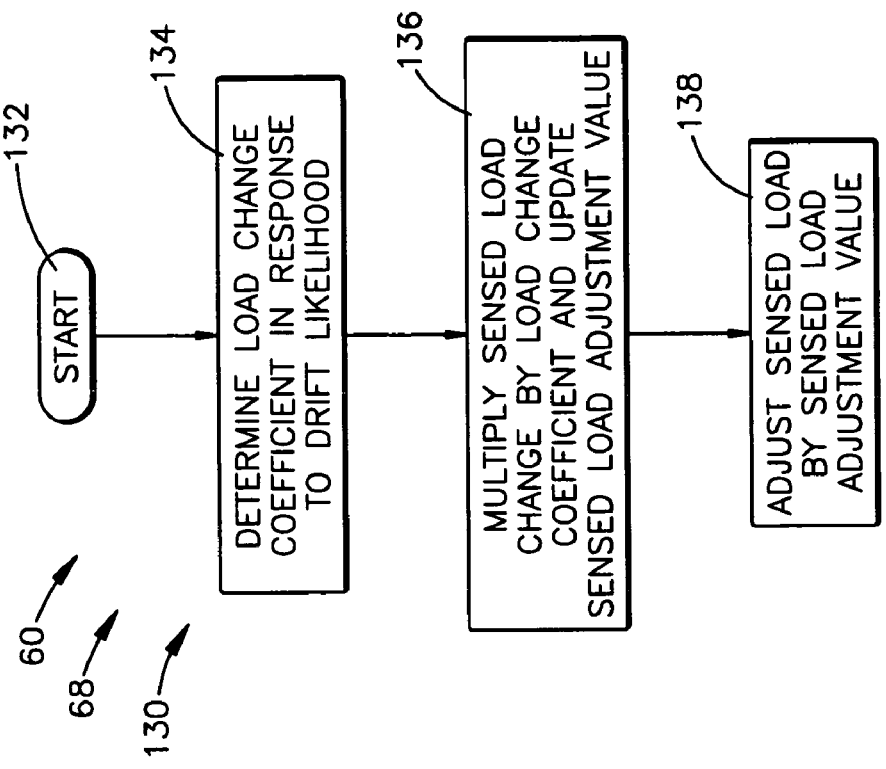
FIG. 6 is a flow chart illustrating a process performed at yet another one of the steps in the process of FIG. 2 according to the invention.

The adjustment to the sensed load in response to the likelihood of an actual load change performed at step 68 of the process 60 is illustrated in FIG. 6. FIG. 6 illustrates a process or method 130 performed within the system 10 of FIG. 1 and, more particularly, the process of FIG. 6 details steps for performing step 68 in the process 60 of FIG. 2. The process 130 of FIG. 6 is implemented in the controller 20 and adjusts the sensed load in response to the likelihood of a sensed load change being caused by drift in the sensed load.

The sensed load adjustment process 130 of FIG. 6 starts, as indicated at step 132, when the process 60 reaches step 68. The process 130 then proceeds to step 134 where a load change coefficient (k) is determined in response to the determined drift likelihood. This may be done, for example, via a look-up table. As explained in further detail below, the load change coefficients (k) are multipliers that determine how much of the sensed load change is corrected as being caused by drift. An example of load change coefficients associated with their corresponding likelihoods of drift in the sensed load is shown above in Table 1.

As shown in Table 1, a rate of change in sensed load of −0.4 to +0.4 kg/second is very likely to have been caused by drift in the sensed load. In this instance, the sensed load change is very unlikely to have been caused by an actual load change. Accordingly, the load change coefficient (0.9) associated with this very likely drift occurrence is relatively high.

Also, as shown in Table 1, a rate of change in sensed load of +0.4 to +0.6 kg/second or −0.4 to −0.6 kg/second is likely to have been caused by drift in the sensed load. In this instance, the sensed load change is unlikely to have been caused by an actual load change. Accordingly, the load change coefficient (0.5) associated with this likely drift occurrence is set at a mid-range value.

Further, as shown in Table 1, a rate of change in sensed load of above +0.6 kg/second or below −0.6 kg/second is very unlikely to have been caused by drift in the sensed load. In this instance, the sensed load change is very likely to have been caused by an actual load change. Accordingly, the load change coefficient (0.0) associated with this very unlikely drift occurrence is set at zero.

Once the load change coefficient (k) is determined, the process 130 proceeds to step 136, where a sensed load adjustment value $W_{adjust}$ is determined by multiplying the sensed load change by the load change coefficient. For the embodiment of the invention implementing the process shown in FIG. 3 and described by Equations 1 and 2, the sensed load adjustment value $W_{adjust}$ is determined according to Equation 5:

$$W_{adjust} = W_{adjust} + k\Delta W(t) \qquad \text{(Equation 5)}$$

For the embodiment of the invention implementing the process shown in FIG. 4 and described by Equations 3 and 4, the sensed load adjustment value $W_{adjust}$ is determined according to Equation 6:

$$W_{adjust} = W_{adjust} + k\Delta W_{avg} \qquad \text{(Equation 6)}$$

In the embodiments illustrated by Equations 5 and 6, it will be appreciated that the sensed load adjustment value $W_{adjust}$ is a cumulative value. This means that the sensed load adjustment value is updated continually as drift induced errors in the sensed load are detected. Thus, for example if one iteration of the process 130 determines a −1.0 kg sensed load adjustment and a subsequent iteration determines a −0.5 kg sensed load adjustment, the sensed load adjustment value $W_{adjust}$ would be −1.5 kg after the second iteration. Because of its cumulative nature, the sensed load adjustment value $W_{adjust}$ may be reset to zero when the process 60 ends, e.g., at the end of an ignition cycle of the vehicle, as described above.

The process 130 then proceeds to step 138, where the sensed load W(s) is adjusted by the sensed load adjustment value $W_{adjust}$ determined at step 136. The sensed load W(s) is determined according to Equation 7:

$$W(s) = W(s) - W_{adjust} \qquad \text{(Equation 7)}$$

The process 130 repeats for each iteration of step 68 of the process 60 of FIG. 2. The process 130 may be active for the entire ignition cycle of the vehicle or for an alternative duration, as described above.

Considering Equations 5-7 in view of Table 1, it will be appreciated that, for a sensed load change that was very unlikely caused by drift and very likely caused by an actual load change, the load change coefficient of 0.0 will result in no adjustment in the sensed load. For a sensed load change that is likely caused by drift and unlikely caused by an actual load change, the load change coefficient of 0.5 will result in the sensed load being adjusted by half the determined load change. For a sensed load change that is very likely caused by drift and very unlikely caused by an actual load change, the load change coefficient of 0.9 will result in the sensed load being adjusted by most (90%) of the determined load change.

It will be appreciated that the values set forth in Table 1 may vary. For example, instead of the three categories (i.e., very unlikely, unlikely, and likely), there could be a different number of categories. For instance, there could be four or more categories, each associated with a predetermined level of confidence that the sensed load change is the result of drift or an actual load change. As another example, the rates of change in sensed loads, the load change coefficients, or both could have different values. This may be done to give the system 10 a greater or lesser degree of sensitivity to perceived drift situations.

Since, as described above, the sensed load adjustment value $W_{adjust}$ is cumulative, the process 60 may include features that help improve the robustness of the system 10. For example, it may be desirable for the sensed load adjustment value $W_{adjust}$ to decay slowly toward zero to help prevent the sensed load adjustment value from remaining at a non-zero level. To accomplish this, the sensed load adjustment value may be filtered using a high pass filter with a long time constant. Alternatively, a linear decay of the sensed load adjustment value, such as 0.0001 kg/sample, may be implemented in the system. These examples may be implemented, for example, at step 68 of the process 60 (see FIGS. 2 and 6).

Figure 7:
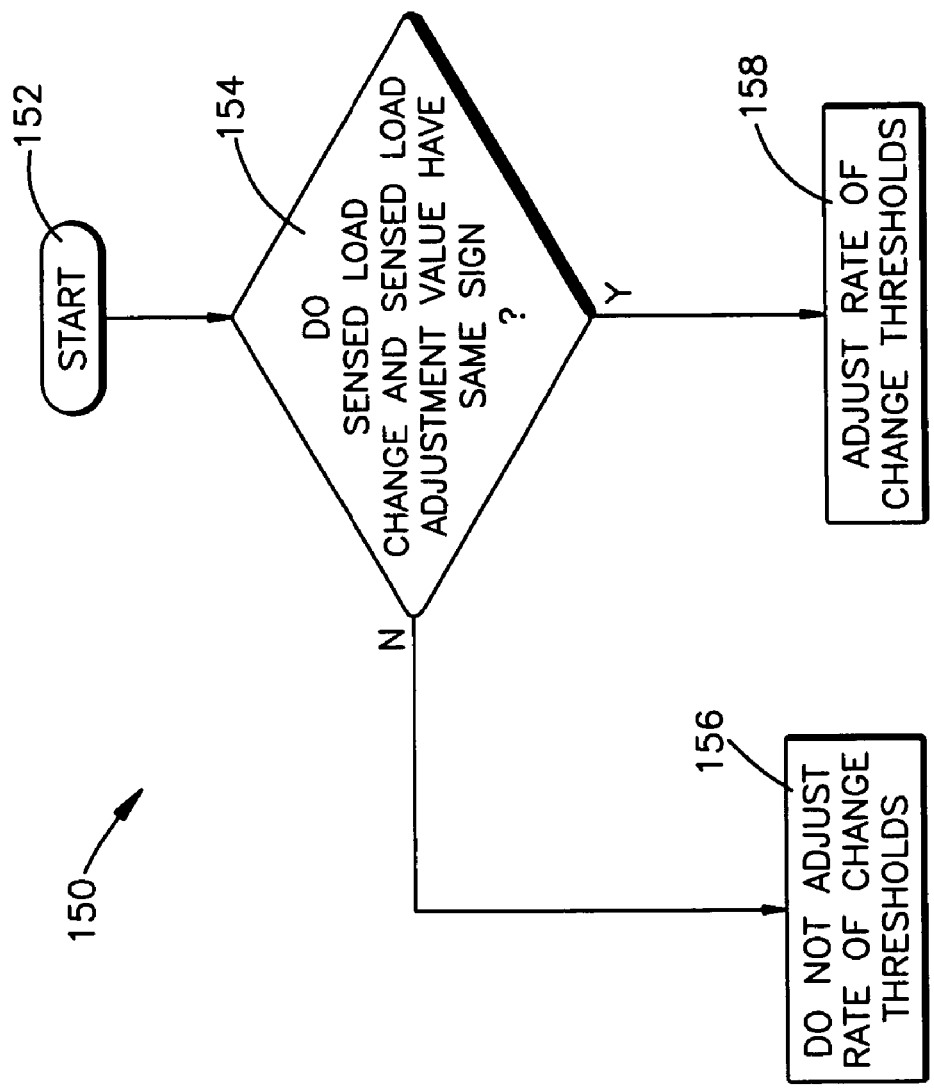
FIG. 7 is a flow chart illustrating steps of a process performed by the system of FIG. 1 according to the invention.

As another example, in order to help improve the robustness of the system 10, the process 60 may also implement a method or steps that bias the sensed load adjustment value $W_{adjust}$ toward zero by adjusting the rate of change thresholds used to determine the load change coefficient k (see Table 1). An example of this is shown in FIG. 7. FIG. 7 illustrates a rate of change threshold adjustment process or method 150 performed within the process system 10 of FIG. 1. More particularly, the process 150 of FIG. 7 may be implemented in the controller 20 as part of the process 60 of FIG. 2 or as a separate process.

The rate of change threshold adjustment process 150 of FIG. 7 begins at step 152 and proceeds to step 154 where a determination is made as to whether the sensed load change $\Delta W(t), \Delta W_{avg}$ and the sensed load adjustment value $W_{adjust}$ have the same sign. If the sensed load change and the sensed load adjustment value $W_{adjust}$ do not have the same sign, the process 150 proceeds to step 156, and the rate of change thresholds $\dot{W}(t), \dot{W}_{avg}$ (see Table 1) are not adjusted. If the sensed load change and the sensed load adjustment value $W_{adjust}$ have the same sign, the process 150 proceeds to step 158, and the rate of change thresholds are adjusted. This may be done by implementing a multiplying factor by which the rate of change thresholds are increased or by implementing adjusted rate of change thresholds in a look-up table in accordance with Table 2 below:

TABLE 2

| Rate of Change Threshold ($\dot{W}(t), \dot{W}_{avg}$) | Likelihood of Drift/ Load Change | Load Change Coefficient (k) |
|---|---|---|
| −0.6 to 0.6 kg/second | Drift Very Likely/ Load Change Very Unlikely | 0.9 |
| 0.6 to 1.0 kg/second −0.6 to −1.0 kg/second | Drift Likely/ Load Change Unlikely | 0.5 |
| Above 1.0 kg/second Below −1.0 kg/second | Drift Very Unlikely/ Load Change Very Likely | 0.0 |

The process 150 may repeat for each iteration of the process 60 of FIG. 2. The process 150 may be active for the entire ignition cycle of the vehicle or for an alternative duration, as described above.

From the above, it will be appreciated that implementation of the rate of change threshold adjustment process 150 makes it more likely for the sensed load adjustment value $W_{adjust}$ to adjust in the direction opposite its current state, i.e., toward zero. For example, if the sensed load adjustment value $W_{adjust}$ is at −1.5 kg and a sensed load change $\Delta W(t), \Delta W_{avg}$ of +0.5 kg is detected, the signs of the sensed load adjustment value and the sensed load change different and the rate of change thresholds $\dot{W}(t), \dot{W}_{avg}$ remain those shown in Table 1. As a result, if the sensed load change resulted in a rate of change of −0.5 kg/second, the change would be categorized as "drift likely/load change unlikely," a load change coefficient of 0.5 would be applied, and the resulting sensed load adjustment value would be adjusted −0.25 to −1.75 kg (see Equations 5 and 6).

If, however, the sensed load adjustment value $W_{adjust}$ is at −1.5 kg and a sensed load change $\Delta W(t), \Delta W_{avg}$ of −0.5 kg is detected, the signs of the sensed load adjustment value and the sensed load change are the same and the rate of change thresholds $\dot{W}(t), \dot{W}_{avg}$ switch to those shown in Table 2. As a result, if the sensed load change resulted in a rate of change of +0.5 kg/second, the change would be categorized as "drift very likely/load change very unlikely," a load change coefficient of 0.9 would be applied, and the resulting sensed load adjustment value would be adjusted +0.45 to −1.05 kg (see Equations 5 and 6).

From the above description of the invention, those skilled in the art will perceive improvements, changes and modifications. Such improvements, changes and modifications within the skill of the art are intended to be covered by the appended claims.

Having described the invention, the following is claimed:

1. A method for adjusting a sensed load of a vehicle seat weight sensing system, the method comprising the steps of:
   determining a rate of change in the sensed load; and
   determining the likelihood of drift in the sensed load in response to the determined rate of change.

2. The method of claim 1, further comprising the step of adjusting the sensed load in response to the determined likelihood drift in the sensed load.

3. The method of claim 1, wherein said step of determining a rate of change comprises the steps of:
   filtering the sensed load;
   sampling the filtered load;
   determining a sensed load change as the difference between different samples of the filtered load; and
   determining the rate of change as the sensed load change over the period of time between the different samples.

4. The method of claim 3, wherein said step of filtering the sensed load comprises the step of implementing a moving average filter.

5. The method of claim 1, wherein said step of determining a rate of change comprises the steps of:
   filtering the sensed load;
   sampling the filtered load;
   averaging samples of the filtered load over an interval;
   determining a sensed load change as the difference between different sample averages; and
   determining the rate of change as the sensed load change over the period of time between the different sample averages.

6. The method of claim 1, wherein said step of determining the likelihood of drift in the sensed load comprises the steps of:
   comparing the rate of change to predetermined categorical thresholds; and
   determining the likelihood of drift in the sensed load based on the threshold category into which the rate of change falls.

7. The method of claim 6, further comprising the step of adjusting the categorical thresholds in response to determining that the sensed load change and a sensed load adjustment value have the same signs.

8. The method of claim 2, wherein said step of adjusting the sensed load in response to the determined likelihood of drift in the sensed load comprises the steps of:
   determining a sensed load change;
   determining a load change coefficient in response to the likelihood of drift in the sensed load;
   multiplying the sensed load change by the load change coefficient to determine a sensed load adjustment value; and
   adjusting the sensed load by said sensed load adjustment value.

9. The method of claim 2, wherein said steps of determining a rate of change, determining the likelihood of drift, and adjusting the sensed load are repeated throughout an ignition cycle of the vehicle.

10. A method for adjusting a sensed load of a vehicle seat weight sensing system, the method comprising the steps of:
    determining a rate of change in the sensed load; and
    adjusting the sensed load compensate for drift in the sensed load in response to the determined rate of change in the sensed load.

11. A vehicle seat weight sensing system comprising:
    a seat weight sensor associated with a vehicle seat;
    a controller operative to determine a sensed weight on the vehicle seat in response to a sensed load provided by said seat weight sensor, said controller comprising:
    means for determining a rate of change in the sensed load;
    means for determining the likelihood of drift in the sensed load in response to the determined rate of change.

12. The system of claim 11, wherein said controller further comprises means for adjusting the sensed load in response to the determined likelihood drift in the sensed load.

13. The system of claim 11, wherein said means for determining a rate of change further comprises:
    means for filtering the sensed load;
    means for sampling the filtered load;
    means for determining a sensed load change as the difference between different samples of the filtered load; and
    means for determining the rate of change as the sensed load change over the period of time between the different samples.

14. The system of claim 13, wherein said means for filtering the sensed load comprises a moving average filter.

15. The system of claim 11, wherein said means for determining a rate of change further comprises:
    means for filtering the sensed load;
    means for sampling the filtered load;
    means for averaging samples of the filtered load over an interval;
    means for determining a sensed load change as the difference between different sample averages; and
    means for determining the rate of change as the sensed load change over the period of time between the different sample averages.

16. The system of claim 11, wherein said means for determining the likelihood of drift in the sensed load comprises:
    means for comparing the rate of change to predetermined categorical thresholds; and means for determining the likelihood of drift in the sensed load based on the threshold category into which the rate of change falls.

17. The system of claim 16, wherein said controller further comprises means for adjusting the categorical thresholds in response to determining that the sensed load change and a sensed load adjustment value have the same signs.

18. The system of claim 12, wherein said means for adjusting the sensed load in response to the determined likelihood of drift in the sensed load comprises:

means for determining a sensed load change;

means for determining a load change coefficient in response to the likelihood of drift in the sensed load;

means for multiplying the sensed load change by the load change coefficient to determine a sensed load adjustment value; and means for adjusting the sensed load by said sensed load adjustment value.

* * * * *